United States Patent
Yuda et al.

(10) Patent No.: US 8,780,805 B2
(45) Date of Patent: Jul. 15, 2014

(54) RADIO COMMUNICATION TERMINAL AND RADIO COMMUNICATION METHOD

(75) Inventors: Yasuaki Yuda, Kanagawa (JP); Seigo Nakao, Kanagawa (JP); Ayako Horiuchi, Kanagawa (JP); Akihiko Nishio, Kanagawa (JP); Daichi Imamura, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 182 days.

(21) Appl. No.: 13/376,694

(22) PCT Filed: Jun. 10, 2010

(86) PCT No.: PCT/JP2010/003887
§ 371 (c)(1),
(2), (4) Date: Dec. 7, 2011

(87) PCT Pub. No.: WO2010/143445
PCT Pub. Date: Dec. 16, 2010

(65) Prior Publication Data
US 2012/0099462 A1    Apr. 26, 2012

(30) Foreign Application Priority Data
Jun. 10, 2009    (JP) ................................ 2009-139294

(51) Int. Cl.
*H04W 4/00*    (2009.01)
(52) U.S. Cl.
USPC ............................ 370/328; 370/332; 370/432
(58) Field of Classification Search
USPC .................................. 370/328, 332, 390, 432
See application file for complete search history.

(56) References Cited

U.S. PATENT DOCUMENTS

2010/0080139 A1    4/2010   Palanki et al.
2010/0080166 A1    4/2010   Palanki et al.
(Continued)

FOREIGN PATENT DOCUMENTS

WO        2010/039738 A2     4/2010

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," Technical Specification, 3GPP TS 36.300 V8.8.0, Mar. 2009, 157 pages.

(Continued)

*Primary Examiner* — Andrew Lee
(74) *Attorney, Agent, or Firm* — Seed IP Law Group PLLC

(57) ABSTRACT

Provided is a radio communication terminal which is capable of measuring quality in communication with a handover destination with high accuracy. The radio communication terminal is capable of communicating with a base station or a relay node, and includes: a receiver which receives control information including information relating to measurement of measuring quality of a neighbor cell; an extractor which extracts information on a subframe where the measurement should be performed, which is a subframe where only transmission of a signal from the relay node connected to the base station is performed, from the information relating to the measurement; a measurement section which performs the measurement, on a subframe basis, based on the extracted information on the subframe where the measurement should be performed: and a transmitter which transmits a result, of the measurement to the base station or the relay node.

11 Claims, 12 Drawing Sheets

(56) References Cited

U.S. PATENT DOCUMENTS

| | | | |
|---|---|---|---|
| 2010/0097978 A1 | 4/2010 | Palanki et al. | |
| 2010/0202311 A1* | 8/2010 | Lunttila et al. | 370/252 |
| 2010/0323738 A1* | 12/2010 | Aiba et al. | 455/509 |
| 2011/0271168 A1* | 11/2011 | Han et al. | 714/807 |
| 2012/0069790 A1* | 3/2012 | Chung et al. | 370/315 |
| 2012/0147841 A1* | 6/2012 | Zhang et al. | 370/329 |
| 2012/0147846 A1* | 6/2012 | Ho et al. | 370/330 |
| 2012/0287901 A1* | 11/2012 | Ahn et al. | 370/330 |
| 2013/0044605 A1* | 2/2013 | Lee et al. | 370/241 |

OTHER PUBLICATIONS

Yuda et al., "A Comparison of FD/TD-Relay scheme for LTE-Advanced," Proceedings of the IEICE General Conference 1: S-54-S55, 2009. (with Partial English Translation).
International Search Report, mailed Sep. 14, 2010, for PCT/JP2010/003887, 2 pages.
Ericsson, TSG-RAN WG1 #55, R1-084357, "Efficient support of relays through MBSFN subframes," Prague, Czech Republic, Nov. 10-14, 2008, 3 pages.
LG Electronics, 3GPP TSG RAN WG1 #55bis, R1-090222, "Consideration on Resource Allocation for Relay Backhaul Link," Ljubljana, Slovenia, Jan. 12-16, 2009, 5 pages.
3GPP TR 36.814 V0.4.1 (Feb. 2009), "Further Advancements for E-UTRA Physical Layer Aspects," (Release 9), 31 pages.
3GPP TS 36.214 V8.6.0 (Mar. 2009), "Evolved Universal Terrestrial Radio Access (E-UTRA); Physical Layer—Measurements," (Release 8), 12 pages.
Motorola, "MBSFN Sub-frame Allocation Signalling," R2-081807, Agenda Item: 4.6.1.1, 3GPP TSG-RAN WG2#61bis, Mar. 31-Apr. 4, Shenzhen, China, 5 pages.
Motorola, "LTE signaling to support Relay operation," R1-084412, Agenda Item: 11.5, 3GPP TSG RAN WG1 Meeting #55, Prague, Czech Republic, Nov. 10-14, 2008, 6 pages.

* cited by examiner

RADIO COMMUNICATION TERMINAL AND RADIO COMMUNICATION METHOD

TECHNICAL FIELD

The present invention relates to a radio communication terminal and a radio communication method which transmit, and receive data to and from a base station.

BACKGROUND ART

The 3GPP (3rd Generation Partnership Project) which is an international mobile communication standardization group has started the standardization of LTE-Advanced (Long Term Evolution-Advanced, LTE-A) as a fourth generation mobile communication system. As disclosed in Non Patent Literature 1, in LTE-A, a relay technology of relaying radio signals by using a relay node CRN) has been studied with the goals of coverage expansion and capacity improvement.

The relay technology will be described with reference to FIG. 12. FIG. 12 is a diagram illustrating a system which relays radio signals using the relay technology. In FIG. 12 eNB represents a base station, RN represents a relay node, and UE represents a radio communication terminal. Further, UE1 represents a radio communication terminal connected to eNB, and UE2 represents a radio communication terminal connected to RN.

Here, in LTE-A, RN having an individual cell ID as in eNB is being studied, and thus, when viewed from UE, RN can also be regarded as one cell like eNB.

eNB is connected to a network by wired communication, whereas RN is connected to eNB by wireless communication. A communication channel connecting between RN and eNB is called a backhaul channel. On the other hand, a communication channel connecting between eNB or RN and UE is called an access channel.

A radio relay system in a downlink channel (Down Link. DL) will be described with reference to FIG. 12. FIG. 12 is a diagram illustrating a radio relay system in the related art. RN receives signals from eNB in the backhaul channel. Further RN transmits signals to UE2 in the access channel of RN.

Here, when the backhaul channel and the access channel are allocated in the same frequency bandwidth, if RN performs transmission and reception at the same time, loop-back interference occurs. For this reason, RN cannot perform transmission and reception at the same time. Thus, in LTE-A, a relay method is being studied in which the backhaul channel and the access channel of RN are allocated while being divided by the time domain (on a subframe basis).

A relay method in the related art in which a backhaul channel and an access channel of RN are allocated while being divided by the time domain (on a subframe basis) for allocation will be described with reference to FIG. 13. FIG. 13 is a diagram illustrating a subframe configuration of a downlink channel in the relay method in the related art. Reference signs [n, n+1, . . . ] in FIG. 13 represent subframe numbers. Boxes in FIG. 13 represent subframes of the downlink channel, and represent transmission subframes of eNB, reception subframes of UE1. transmission subframes of RN and reception subframes of UE2.

As shown in FIG. 13, eNB transmits signals in all the subframes. Further, UE1 receives signals in all the subframes. Further, as shown in FIG. 13, RN transmits signals in the subframes except for the subframe numbers [n+2, n+6]. UE2 can receive signals in the subframes except for the subframe numbers [n+2, n+6]. Furthermore, RN receives signals from eNB in the subframes of the subframe numbers [n+2, n+6].

As described above, in RN, the subframes of the subframe numbers [n+2, n+6] serve as the backhaul channel of RN, and the other subframes of the subframe numbers [n, n+1, n+3, n+4 and n+5] serve as the access channel of RN.

However, if RN transmits no signal in the subframes where RN serves as the backhaul channel, a problem occurs that a measurement operation of measuring the quality of RN does not function at UE of LTE which has not ascertained the presence of RN.

As a method of solving this problem, in LTE-A, using an MBSFN (Multicast/Broadcast over Single Frequency Network) subframe defined in LTE is being considered.

The MBSFN subframe is a subframe which is prepared to realize an MBMS (Multimedia Broadcast and Multicast Service) service in the future. The MBSFN subframe is designed to transmit cell-specific control information at the first two symbols and transmit signals for the MBMS in the domains of the third and subsequent symbols of the MBSFN subframe.

Here, the LTE terminal is capable of performing measurement by using the first two symbols in the MBSFN subframe. Thus, the MBSFN subframe is used in a pseudo-manner in the RN cell, and RN is capable of using the MBSFN subframe as the reception subframe of the backhaul channel. Specifically, RN transmits the control information specific to the RN cell at the first two symbols of the MBSFN subframe, and does not transmit data for the MBMS but receives signals from eNB in the domains of the third and subsequent symbols of the MBSFN subframe.

In this description, the MBSFN subframe as mentioned above will be called an "MBSFN subframe that RN uses as the backhaul".

In this regard, in a mobile communication system, a situation occurs in which, when UE communicates with a certain eNB, received power from eNB is lowered due to movement of UE, change in the surrounding environment or the like and thus UE cannot maintain communication with eNB.

To cope with such a situation, UE can be re-connected to eNB or RN which is higher in received power than eNB in communication therewith, to thereby maintain communication. This is called handover.

Hereinafter, eNB or RN will be also called a "cell", and a cell which communicates with UE will be also called an "own cell".

In order to perform the handover, it is necessary that UE measures signal power from a cell which is present in the vicinity of the cell in communication therewith (the cell which is present in the vicinity of the own cell may be called a neighbor cell). In the 3GPP LTE, a process of measuring signal power or signal quality from this neighbor cell is called measurement.

In the measurement, a cell instructs UE to measure received power or quality from a neighbor cell, and UE measures the received power from the neighbor cell and notifies the own cell of the measurement result. UE performs the measurement using a reference signal (RS) or a synchronization signal generated on the basis of a cell-specific series.

In the measurement of LTE, as disclosed in Non Patent Literature 2, UE measures RSRP (Reference Signal Received Power) or RSRQ (Reference Signal Received Quality) using a cell-specific reference signal.

CITATION LIST

Non Patent Literature

Non Patent Literature 1: 3GPP TR36. 814 v0.4.1 (2009-02) Further Advancements for E-UTRA Physical Layer Aspects (Release 9)

NonPatent Literature 2: 3GPP TS36. 214 vS.6.0 (2009-03) Physical layer-Measurements (Release 8)

SUMMARY OF INVENTION

Technical Problem

In LTE, as measurement in a case where an MBSFN subframe is present, the following operations are performed, for example. Firstly, a cell notifies UE, which is under the control of the cell, of the position of the MBSFN subframe in SIB2 (System Information Block 2) which notifies system information.

As described above, since the MBSFN subframe is originally prepared to realize the MBMS service, UE, in particular, UE in LTE recognizes that the MBSFN subframe is also present in the neighbor cell, in the MBSFN subframe of the own cell. Thus, UE is capable of performing a measurement operation suitable for the MBSFN subframe, in the MBSFN subframe of the own cell. For example, UE may perform measurement using only the first two symbols, may not perform measurement in the MBSFN subframe, or may perform similar operations.

In LTE-A, when RN uses the MBSFN subframe as the backhaul, there is a case where the position of the "MBSFN subframe that RN uses as the backhaul" is different in each RN. In this case, a subframe which is not the MBSFN subframe of the own cell serves as the MBSFN subframe in a neighbor RN.

Here, the neighbor RN does not transmit signals so as to receive signals from eNB in the domains of the third and subsequent symbols of the "MBSFN subframe that RN uses as the backhaul". In a case where RN which does not transmit signals in the "MBSFN subframe that RN uses as the backhaul" is not a target cell of measurement in UE, if no signal is transmitted from the corresponding RN, it is seen on the side of UE that interference in signals from the target cell is reduced.

If UE performs measurement of the target cell in a state where the interference in the signals from the target cell is reduced, a problem arises that an error occurs between quality based on the measurement result and actual quality in which interference is present. For example, if UE recognizes that the quality based on the measurement result is superior to the actual quality and performs handover, there is a problem in that a cell which is a handover destination cannot achieve a throughput expected on the basis of the measurement result by UE.

An object of the present invention is to provide a radio communication terminal and a radio communication method which are capable of measuring quality in communication with a handover destination with high accuracy.

Solution to Problem

The present invention provides a radio communication terminal which is capable of communicating with a base station or a relay node, the radio communication terminal including: a receiver which receives control information including information relating to measurement of measuring quality of a neighbor cell an extractor which extracts information on a subframe where the measurement should be performed, which is a subframe where only transmission of a signal from the relay node connected to the base station is performed, from the information relating to the measurement: a measurement section which performs the measurement on a subframe basis, based on the extracted information on the subframe where the measurement should be performed; and a transmitter which transmits a result of the measurement to the base station or the relay node.

In the radio communication terminal the extractor extracts information on a subframe which is the subframe where the measurement should be performed and is not an MBSFN subframe used as a backhaul in the relay node connected to the base station, from the information relating to the measurement, and the measurement section performs the measurement in the subframe which is not the MBSFN subframe.

In the radio communication terminal, the receiver receives the control information including the information relating to the measurement of measuring the quality of the neighbor cell including the information on the subframe where the measurement should be performed, from the base Station or the relay node which is a connection destination of the radio communication terminal.

In the radio communication terminal, the extractor extracts information on a subframe which is the subframe where the measurement should be performed and is not an MBSFN subframe used as a backhaul in a relay node which is the relay node connected to the base station and belongs to a relay node group including a plurality of neighbor relay nodes, from the information relating to the measurement, and the measurement section performs the measurement on a subframe basis on the basis of the extracted information on the subframe.

The present invention also corresponds to a radio communication terminal which is capable of communicating with a base station or a relay node, the radio communication terminal including: a receiver which receives a reference signal of a neighbor cell and control information relating to the radio communication terminal; an extractor which extracts instruction information for performing measurement of measuring quality of the neighbor cell, from the control information: a detector which detects a subframe where the measurement should be performed using the reference signal of the neighbor cell based on the extracted instruction information; a measurement section which performs the measurement in the detected subframe where the measurement should be performed; and a transmitter which transmits a result of the measurement to the base station or the relay node.

The present invention also corresponds to a radio communication terminal which is capable of communicating with a base station or a relay node, the radio communication terminal including: a receiver which receives a reference signal of a neighbor cell, information relating to measurement of measuring quality of the neighbor cell and control information on the radio communication terminal: a first extractor which extracts, on a subframe basis, position information on a first subframe which is a candidate where the measurement should be performed in a relay node which is the relay node connected to the base station and belongs to a relay node group including a plurality of neighbor relay nodes, from the information relating to the measurement: a detector which measures received power on a subframe basis in the relay node group based on the extracted position information on the first subframe and the reference signal of the neighbor cell, and detects the relay node group which has the smallest change in a result of the measurement for the received power: a second extractor which extracts information on a second subframe which is not an MBSFN subframe used as a backhaul in the relay node which belongs to the detected relay node group; and a measurement section which performs the measurement, on a subframe basis, based on the extracted information on the second subframe.

The present invention also provides a radio communication method used in a radio communication terminal which is capable of communicating with a base station or a relay node, the radio communication method including: receiving control information including information relating to measurement of measuring quality of a neighbor cell: extracting information on a subframe where the measurement, should be performed, which is a subframe where only transmission of a signal from the relay node connected to the base station is performed, from the information relating to the measurement: performing the measurement on a subframe basis, based on the extracted information on the subframe where the measurement should be performed; and transmitting a result of the measurement to the base station or the relay node.

The present invention also provides a radio communication method used in a radio communication terminal which is capable of communicating with a base station or a relay node, the radio communication method including: receiving a reference signal of a neighbor cell and control information relating to the radio communication terminal: extracting instruction information for performing measurement of measuring quality of the neighbor cell, from the control information: detecting a subframe where the measurement should be performed using the reference signal of the neighbor cell based on the extracted instruction information; performing the measurement in the detected subframe where the measurement should be performed; and transmitting a result of the measurement, to the base station or the relay node.

The present invention also provides a radio communication method used in a radio communication terminal which is capable of communicating with a base station or a relay node, the radio communication method including: receiving a reference signal of a neighbor cell, information relating to measurement of measuring quality of the neighbor cell and control information on the radio communication terminal: extracting, on a subframe basis, position information on a first subframe which is a candidate where the measurement should be performed in a relay node which is the relay node connected to the base station and belongs to a relay node group including a plurality of neighbor relay nodes, from the information relating to the measurement; measuring received power in the relay node group, on a subframe basis, based on the extracted position information on the first subframe and the reference signal of the neighbor cell, and detecting the relay node group which has the smallest change in a result of the measurement for the received power; extracting information on a second subframe which is not an MBSFN subframe used as a backhaul in the relay node which belongs to the detected relay node group: and performing the measurement on a subframe basis, based on the extracted information on the second subframe.

Advantageous Effects of Invention

According to the radio communication terminal and the radio communication method of the present invention, as UE performs measurement for handover in subframes, which are not used as the backhaul in a plurality of RNs connected to one eNB, where signals from the plurality of RNs are transmitted, it is possible to measure quality in communication with a handover destination with high accuracy.

MODES FOR CARRYING OUT INVENTION (First Embodiment)

Hereinafter, a first, embodiment of the present invention will be described with reference to FIGS. 1 to 7.

Figure 1:
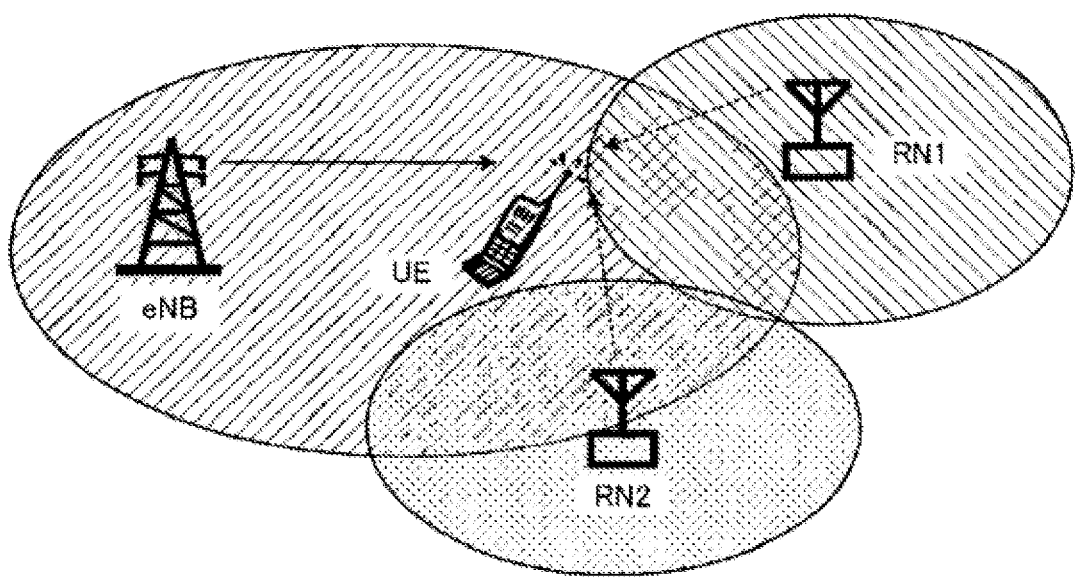
FIG. 1 is a diagram illustrating a radio relay system according to a first embodiment of the present invention.

Firstly, a radio relay system in Che first embodiment of the present invention will be described. FIG. 1 is a diagram illustrating the radio relay system according to the first embodiment of the present invention. In FIG. 1, eNB represents a base station (base station apparatus) 200, RN1 and RN2 represent relay stations 310 and 320, and UE represents a radio communication terminal 100, respectively.

Hereinafter, in the first embodiment, the radio communication terminal 100 is referred to as UE, the base station 200 is referred to as eNB, and the relay stations 310 and 320 are referred to as RN1 and RN2, respectively.

Hereinafter, in the first embodiment, as studied in LTE-A. RN1 and RN2 have an individual cell ID, in a similar way to eNB. Thus, when viewed from UE, RN1 and RN2 may be considered as one cell, respectively, in a similar way to eNB.

Hereinafter, in the first embodiment, as studied in LTE-A, a relay method of dividing a backhaul channel and an access channel of RN by time domains (on a subframe basis) for allocation is used.

Here, in the radio relay system shown in FIG. 1, errors occurred between quality based on a measurement result and actual quality in a handover destination are considered. The errors include a first error due to inferiority of the measurement result to the actual quality and a second error due to superiority of the measurement result to the actual quality.

As an example of occurrence of the first error, there is a case where characteristics expected on the basis of the measurement result cannot be obtained, even though the handover destination is determined on the basis of the measurement result. Further, in a case where the actual quality of the handover destination is much inferior to the measurement result, the characteristics are inferior compared with the time before handover is performed. Alternatively, there is a case that UE cannot maintain communication.

On the other hand, as an example of occurrence of the second error, there is a case where characteristics superior to the characteristics expected on the basis of the measurement result can be obtained in the handover destination. As the errors between the measurement result and the actual quality of the handover destination, the first error has a significant influence on the radio relay system shown in FIG. 1, compared with the second error. Thus, it is preferable to avoid the occurrence of the first error.

Accordingly, in a case where the quality of the handover destination is changed, if UE performs measurement in the case of the worst quality to inform eNB of the result, it is possible to avoid the above-described first error.

Here, the worst quality refers to quality based on the measurement result in a case where interference is the strongest due to signals transmitted from the own cell and a different cell.

That is, at the timing when the neighbor RN1 and RN2 transmit signals, UE may perform measurement. In other words, in subframes which are not an "MBSFN subframe that RN uses as a backhaul" in the neighbor RN1 and RN2, UE performs measurement.

Here, the neighbor RN refers to, in a case where the own cell is RN, an RN to which UE is connected and other RNs connected to eNB to which the RN is connected, and refers to, in a case where the own cell is eNB, RNs connected to the eNB.

As described above, one characteristic of the present embodiment is that UE performs measurement of handover in the subframes which are not the "MBSFN subframe that RN uses as the backhaul" in all the neighbor RNs.

Figure 2:
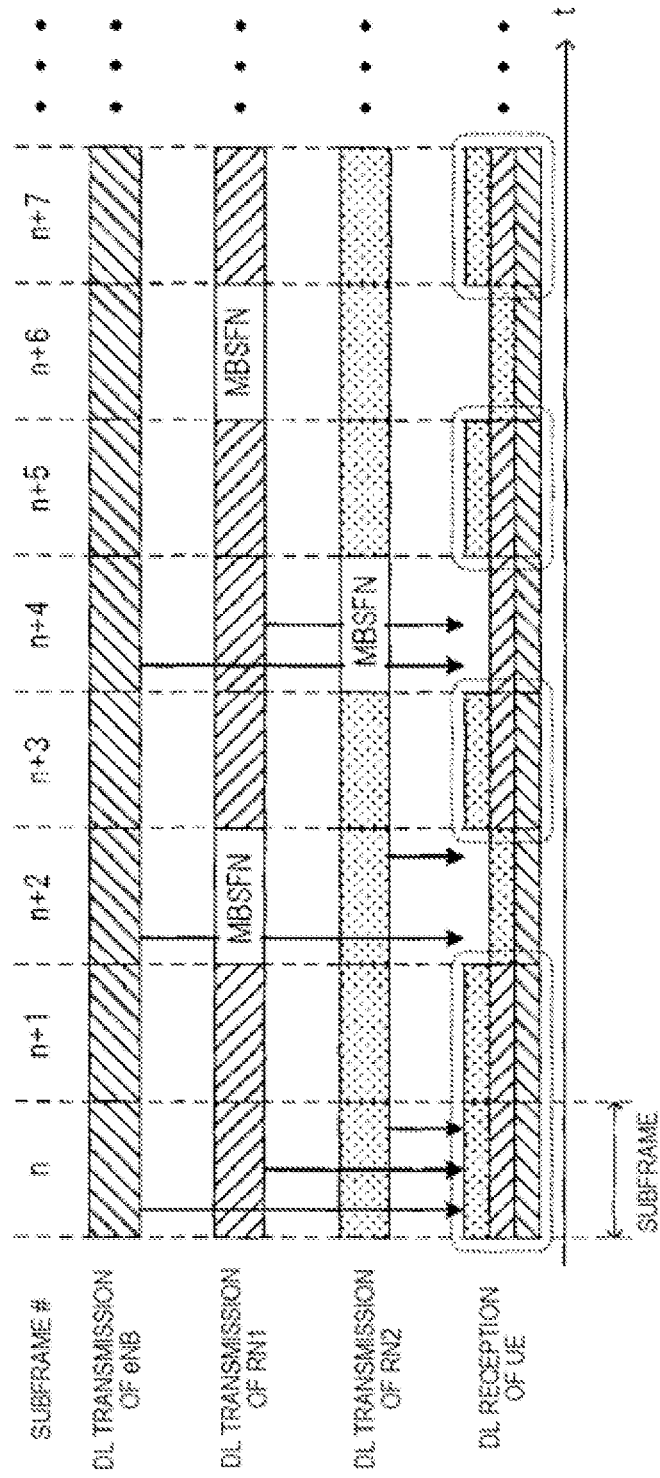
FIG. 2 is a diagram illustrating downlink subframes in FIG. 1.

Here, the measurement of handover according to the present embodiment will be described with reference to FIGS. 1 and 2. FIG. 2 is a diagram illustrating downlink (DL) subframes in FIG. 1.

In FIG. 2, eNB transmits signals in all the subframes. Further, RN1 sets subframes [n+2, n+6] as the "MBSFN subframes that RN uses as the backhaul". Thus, RN1 does not transmit a signal in the subframes [n+2, n+6]. Similarly, RN2 sets a subframe [n+4] as the "MBSFN subframe that RN uses as the backhaul". Thus, RN2 does not transmit a signal in the subframe [n+4].

UE receives all the signals from eNB, RN1 and RN2 in the subframes [n, n+1, n+3, n+5, n+7]. Thus, from the standpoint of UE, the subframes [n, n+1, n+3, n+5, n+7] become subframes in which interference components become the highest in a case where measurement of the neighbor cells is performed.

Accordingly, UE performs measurement of the neighbor cells using the subframes [n, n+1, n+3, n+5, n+7] as the subframes in which the measurement is performed.

That is, UE performs measurement of the neighbor cells in the subframes which are not the "MBSFN subframes that RN uses as the backhaul", in all the neighbor RNs.

Hereinafter, an example of a specific method of realizing the measurement of handover in the present embodiment, will be described with reference to FIGS. 2 to 4.

eNB, RN1 and RN2 notify UE of the subframes where UE should perform measurement. Then, UE performs measurement in the subframes in which measurement should be performed.

It is necessary that eNB, RN1 and RN2 share the timing of the "MBSFN subframes that RN uses as the backhaul" among eNB, RN1 and RN2. Thus, eNB, RN1 and RN2 share the position of the "MBSFN subframes that RN uses as the backhaul".

The position of the "MBSFN subframe that RN uses as the backhaul" is shared among eNB, RN1 and RN2, using control information on RN1 and RN2 (including control information on an upper layer).

Further, by notifying position information on the "MBSFN subframe that RN uses as the backhaul", relating to other RNs connected to eNB, in the control information on RN1 and RN2, it is possible to share the position information on the "MBSFN subframe that RN uses as the backhaul" in each RN, even among RN1, RN2 and the other RNs.

That is, eNB, RN1 and RN2 can recognize the position information on the subframes which are not the "MBSFN subframes that RN uses as the backhaul" in the neighbor RNs. Accordingly, eNB, RN1 and RN2 can notify UE of the subframes which are not the "MBSFN subframes that RN uses as the backhaul" as the subframes where measurement should be performed, in the neighbor RNs.

As a method of notifying UE of the subframes where measurement should be performed, for example, a method of notifying the subframes where measurement should be performed by a bit map or a method of tabulating the subframes where measurement should be performed to notify an index of the table, is used.

<Notification Method of Subframes—Bit Map>

The method of notifying UE of the subframes where measurement should be performed by a bit map will be described with reference to FIG. 3. FIG. 3 is a diagram illustrating a bit map expression of the subframes where measurement is performed in FIG. 2.

Figure 3:
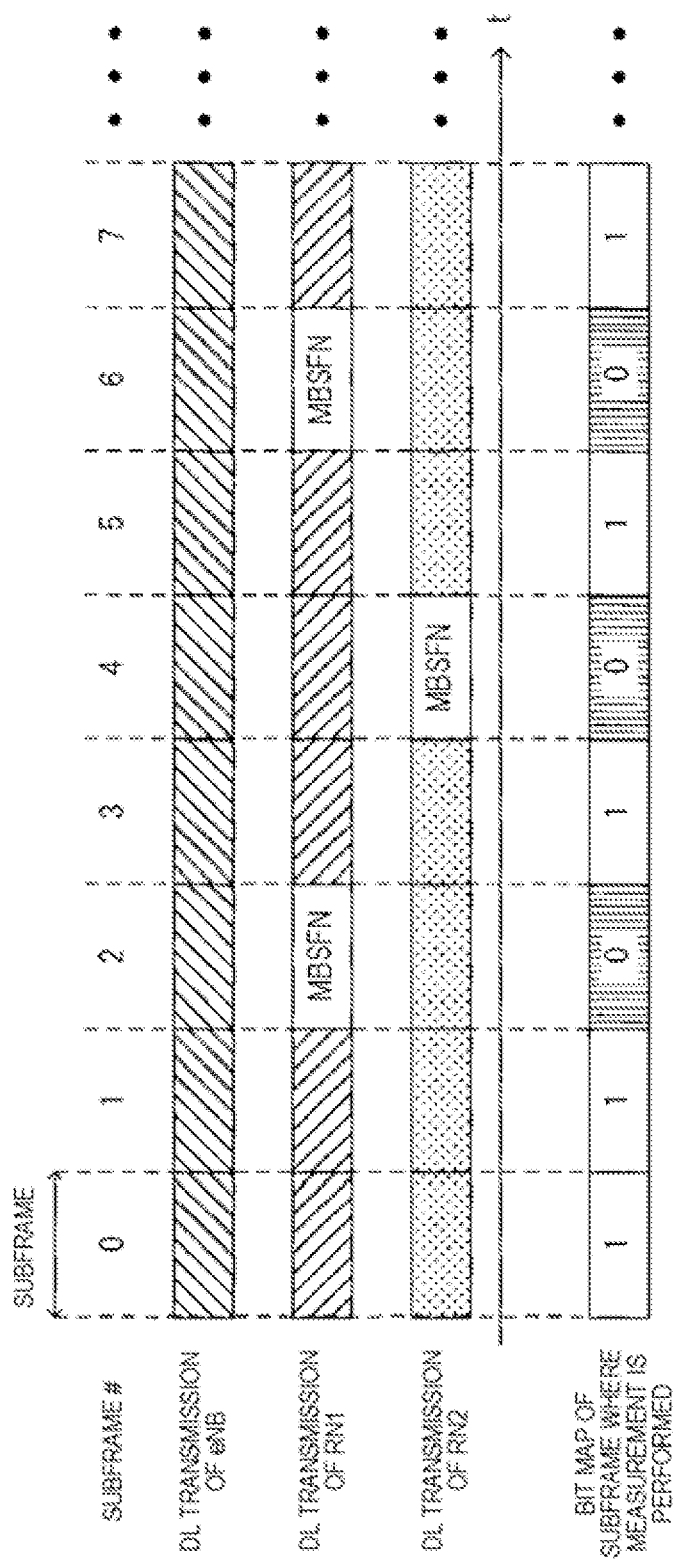
FIG. 3 is a diagram illustrating a bit map of subframes where measurement is performed in FIG. 2.

Here, in FIG. 3, the subframe numbers [n, n+1, . . . n+7, . . . ] are replaced with [0, 1, . . . 7, . . . ]. In a case where the subframes are notified by the bit map, it; is difficult to notify all the subframes. Thus, it is necessary to assign periodicity to the subframes notified by the bit map to be patterned. A start subframe number of the pattern is set to 0.

For example, as the pattern of the bit map, a pattern including a frame formed by ten subframes or a pattern obtained by connecting the plurality of frames (for example, pattern obtained by connecting four frames) is used.

In the bit map shown in FIG. 3, "1" represents subframes where measurement is performed, and "0" represents subframes where measurement is not performed.

Since the subframes where measurement is performed are subframes which are not the "MBSFN subframe that RN uses as the backhaul" in all the neighbor RNs, the subframes [0, 1, 3, 5, 7, . . . ] become "1" in the bit map pattern, in FIG. 3. eNB, RN1 or RN2 notifies UE of the bit map pattern "110101011 . . . " as the subframes where measurement should be performed, and thus, UE can perform measurement in the subframe number corresponding to "1" in the bit map pattern.

<Notification Method of Subframes—Tabulation>

Next, the notification method by tabulation and using an index will be described with reference to FIG. 4. FIG. 4 is a diagram illustrating subframes where measurement is performed using, as an example, the case of the downlink subframes in FIG. 2, in a similar way to a case where notification is performed by the bit map shown in FIG. 3.

Figure 4:
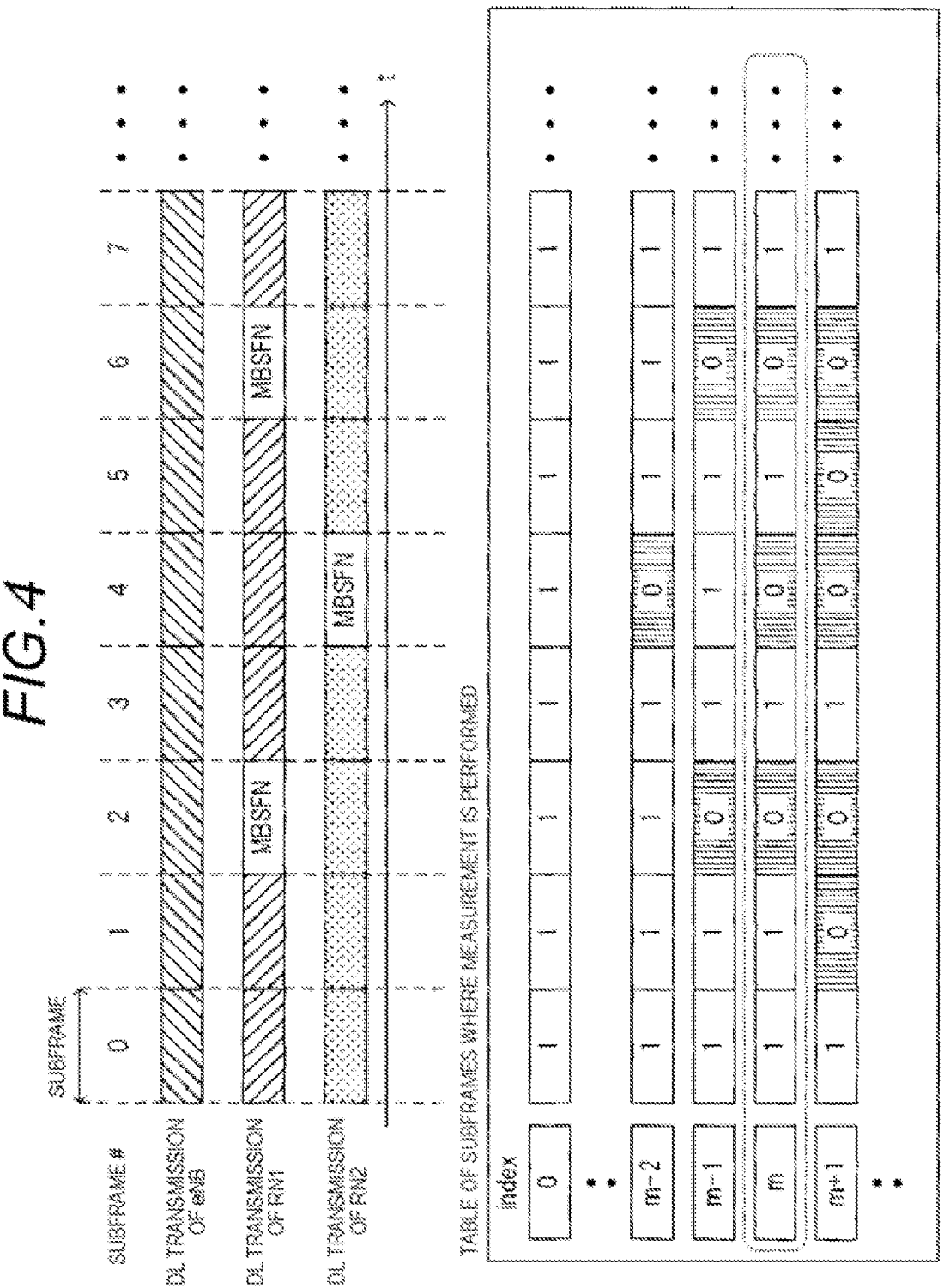
FIG. 4 is a diagram illustrating subframes where measurement is performed in FIG. 2.

As shown in FIG. 4, a table of subframes where measurement is performed is prepared in advance, which is shared among eNB, RN1, RN2 and UE. For example, in the "table of subframes where measurement is performed" shown in FIG. 4, a table number "0" represents that all the subframes are subframes where measurement is performed. Further, a table number "m" represents that the subframes [0, 1, 3, 5, 7, . . . ] are subframes where measurement is performed.

In the case of the downlink subframes shown in FIG. 4, the subframes [2, 6] are the "MBSFN subframes that RN use as the backhaul" in RN1. Further, the subframe [4] is the "MBSFN subframe that RN uses as the backhaul" in RN2. Accordingly, the subframes [0, 1, 3, 5, 7, . . . ] become subframes where UE performs measurement. As the table number "m" is notified from eNB, RN1 and RN2 to UE under the control thereof, UE can ascertain the subframes where measurement should be performed, to thereby perform measurement in the subframe.

As described above, in the present embodiment. UE can measure the quality in communication with the handover destination with high accuracy. Thus, in the present embodiment, it is possible to suppress the errors occurred between the measurement result and the actual quality of the handover destination, and the UE can achieve the throughput expected on the basis of the measurement result in the handover destination.

<Configuration of Radio Communication Terminal>

Figure 5:
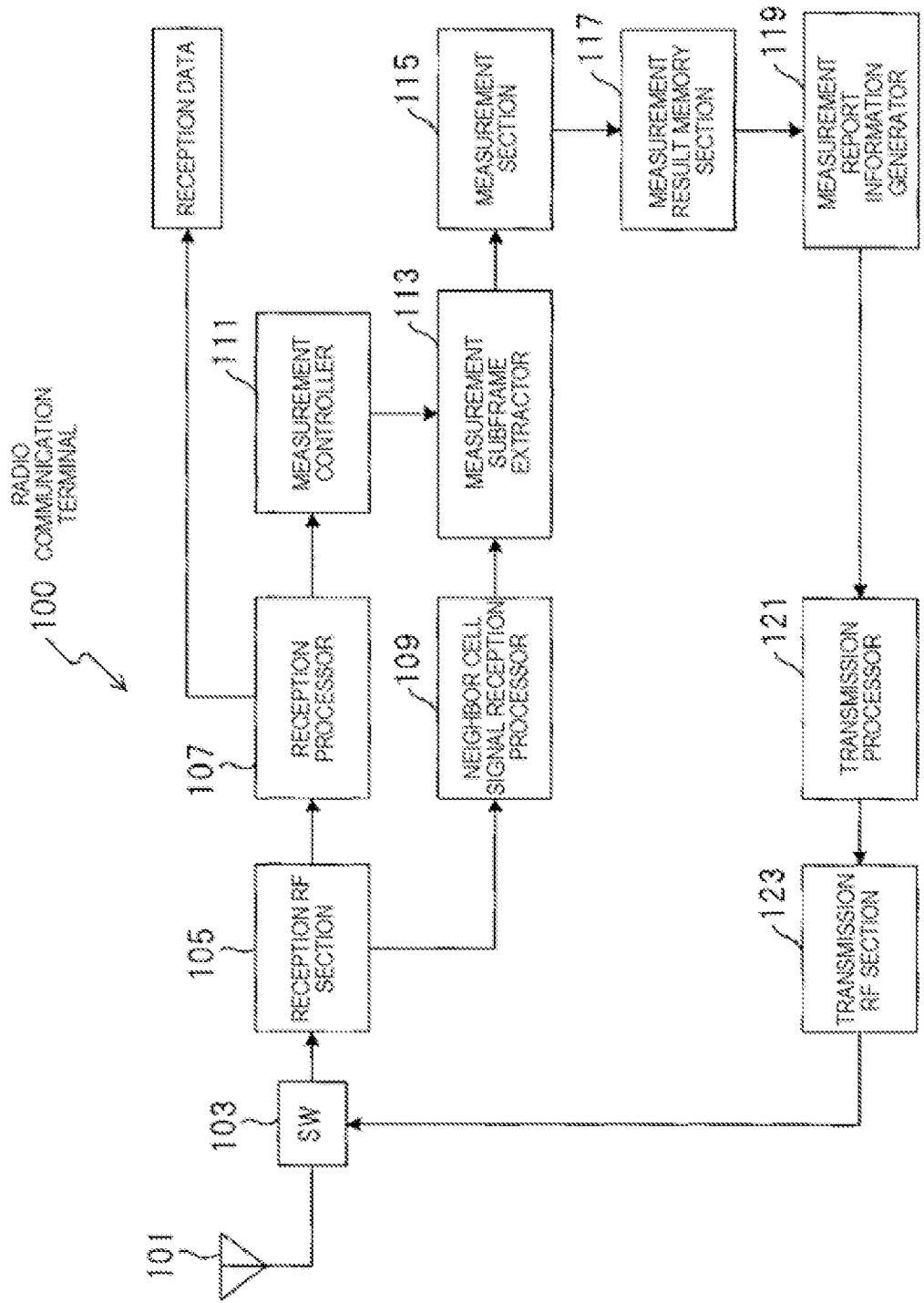
FIG. 5 is a block diagram illustrating a configuration of a radio communication terminal 100 according to the first embodiment.

Next, a configuration of the radio communication terminal 100 according to the first embodiment will be described with reference to FIG. 5. FIG. 5 is a block diagram of the radio communication terminal 100 according to the first embodiment. The radio communication terminal 100 shown in FIG. 5 includes an antenna 101, a switch (SW) 103, a reception RF section 105, a reception processor 107, a neighbor cell signal reception processor 109, a measurement controller 111, a measurement subframe extractor 113, a measurement section 115, a measurement result memory section 117, a measurement report information generator 119, a transmission processor 121, and a transmission RF section 123.

The reception RF section 105 performs filtering processing for signals received by the antenna 101 in order to remove signals except for a communication bandwidth, performs frequency conversion to an IF frequency bandwidth or to a baseband, and outputs the resultant signals to the reception processor 107 and the neighbor cell signal reception processor 109.

The reception processor 107 performs reception processing for the signals output from the reception RF section 105, separates data and control information which are multiplexed in the received signals, and outputs them. Specifically, the reception processor 107 converts the analog signals to digital signals by an AD converter or the like, and performs demodulation processing, decoding processing and the like.

The neighbor cell signal reception processor 109 performs reception processing for the signals from the neighbor cells, with respect to the signals output from the reception RF section 105, and outputs the result to the measurement subframe extractor 113. This process is the same process as in the reception processor 107, but is different therefrom in that the processing specific to the neighbor cells is performed. Specifically, reception processing for a reference signal or the like is an example of the difference. In LTE, since the reference signal is transmitted in a cell-specific series, the neighbor cell signal reception processor 109 performs reception processing for signals specific to the neighbor cells which are the reference signals according to the neighbor cell series.

Further, using the output signals of the neighbor cell signal reception processor 109, a necessary signal is output for measuring the quality of the neighbor cells in the measurement, section 115 at the subsequent stage. For example, in a case where a desired signal component is measured, the neighbor cell signal reception processor 109 outputs the reference signal. Further, in a case where an interference component is measured, the neighbor cell signal reception processor 109 outputs a data signal.

When instruction information for performing measurement is included in the control information on the radio communication terminal output from the reception processor 107, the measurement controller 111 extracts information relating to the subframe where measurement should be performed from the control information to output the extracted information to the measurement subframe extractor 113. Here, as a method of notifying the subframes where measurement should be performed to the radio communication terminal from eNB, a method of notifying the subframes where measurement should be performed using the bit map pattern as described with reference to FIG. 3 or a method of tabulating the subframes where measurement should be performed to notify an index of the table as described with reference to FIG. 4, is used.

On the basis of the information relating to the subframes where measurement should be performed, which is output from the measurement section 115, the measurement subframe extractor 113 extracts the signals specific to the neighbor cells output from the neighbor cell signal reception processor 109 on a subframe basis, to output the result to the measurement section 115.

The measurement section 115 performs the measurement using the signals of the neighbor cells extracted by the measurement subframe extractor 113, and outputs the result to the measurement result memory section 117.

The measurement result memory section 117 stores the measurement result measured by the measurement section 115, and outputs the result to the measurement report information generator 119.

At the timing when the measurement result is reported to eNB, the measurement report information generator 119 generates the measurement report information to be reported to eNB using the measurement result stored in the measurement result memory section 117, and outputs the result to the transmission processor 121.

The transmission processor 121 performs transmission processing so that the measurement report information generated by the measurement report information generator 119 can be transmitted to eNB, and then outputs the result to the transmission RF section 123. The transmission processing includes signal multiplexing of transmission data, feedback information or the like, encoding processing, modulation processing, and the like.

The transmission RF section 123 performs frequency conversion into RF frequency, power amplification and transmission filtering processing for the transmission signal which is transmission-processed by the transmission processor 121, and outputs the result to the antenna 101 through the switch (SW) 103.

Figure 6:
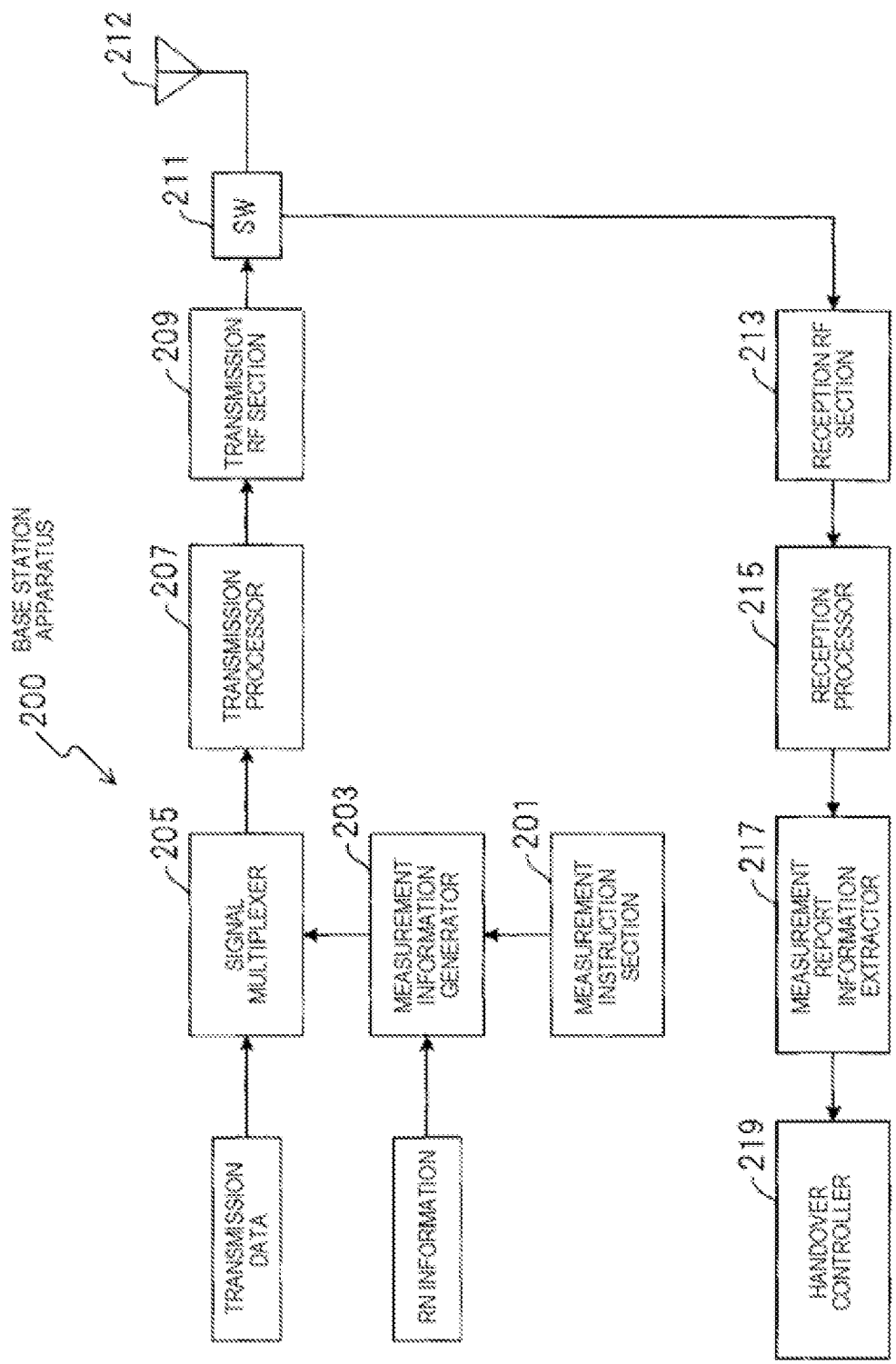
FIG. 6 is a block diagram illustrating a configuration of a base station apparatus 200 according to the first embodiment.

Next, a configuration of the base station apparatus 200 (eNB) according to the present embodiment will be described with reference to FIG. 6. FIG. 6 is a block diagram illustrating the configuration of the base station 200 according to the first embodiment. The base station apparatus 200 shown in FIG. 6 includes a measurement instruction section 201, a measurement information generator 203, a signal multiplexer 205, a transmission processor 207, a transmission RF section 209, a switch (SW) 211, an antenna 212, a reception RF section 213, a reception processor 215, a measurement report information extractor 217, and a handover controller 219.

Transmission data in the figure is transmission data to each UE, which is input to the signal multiplexer 205. RN information in the figure includes neighbor RN information which is information relating to the neighbor RNs and includes position information on the "MBSFN subframe that RN uses as the backhaul" in the neighbor RNs, or the like. The RN information is input to the measurement, information generator 203.

The measurement, instruction section 201 instructs the measurement information generator 203 to generate measurement information so that measurement of the neighbor cells should be performed by UE in which the handover is necessary.

The measurement information generator 203 generates the information relating to measurement based on the measurement instruction of the measurement instruction section 201, and outputs the result to the signal multiplexer 205.

Here, the information relating to measurement includes information relating to a subframe where measurement should be performed, which is a subframe which is not the "MBSFN subframe that RN uses as the backhaul" in the neighbor RNs, using the neighbor RN information included in the RN information.

The signal multiplexer 205 multiplexes the input, transmission data to each UE, the control information (not shown), the information relating to measurement, and the like, and outputs the result to the transmission processor 207. The signal multiplexer 205 arranges the transmission data to each UE to perform user multiplexing, and performs multiplexing with other signals.

The transmission processor 207 performs transmission processing for the signals multiplexed by the signal multiplexer 205, and outputs the result to the transmission RF section 209. The transmission processing includes encoding processing, modulation processing and the like, for example.

The transmission RF section 209 performs frequency conversion into RF frequency, power amplification and transmission filtering processing for the transmission signals which are transmission-processed by the transmission processor 207, and outputs the result to the antenna 212 through the switch (SVV) 211.

The reception RF section 213 performs filtering processing for the signals received by the antenna 212 in order to remove signals except for a communication bandwidth, performs frequency conversion to an IF frequency bandwidth or to a baseband, and outputs the result to the reception processor 215.

The reception processor 215 performs reception processing for the signals output from the reception RF section 213, and separates the signals into the reception data, the control information and the like. Specifically, the reception processor 215 converts the analog signals to digital signals by an AD converter or the like, and performs demodulation processing, decoding processing and the like.

The measurement report, information extractor 217 extracts measurement report information from the control information separated by the reception processor 215, and outputs the result to the handover controller 219.

The handover controller 219 controls handover on the basis of the measurement report, information extracted by the measurement report information extractor 217.

In the present embodiment, eNB, RN1 or RN2 notifies UE of the subframes where measurement should be performed, but this is not limitative. For example, eNB, RN1 or RN2 may not notify UE of the subframes where measurement should be performed, but UE may detect the subframes where measurement should be performed, to thereby perform measurement.

Here, as a method of detecting the subframes where measurement should be performed by UE, for example, a method of detecting the subframes where measurement should be performed using the received power or a method of detecting the subframes where measurement should be performed by receiving control information (PDCCH or the like of LTE) about the downlink transmitted by eNB, RN1 or RN2, is used.

<Detection of Subframes where Measurement Should be Performed—Received Power>

FIRST EXAMPLE

As a first example of the method of detecting the subframes where measurement should be performed using the received power, the following method is used. Firstly, UE measures the received power over the plurality of subframes, and detects a subframe where the received power is the largest. UE sets a threshold which becomes a predetermined power difference with reference to the largest received power, and detects a subframe where the received power is lower than the threshold as the "MBSFN subframe that RN uses as the backhaul" in the neighbor RNs. UE sets subframes except for the detected "MBSFN subframe that RN uses as the backhaul" in the neighbor RNs, as the subframes where measurement should be performed.

For example, where the largest received power of the detected subframe is Pmax, the predetermined power difference is Pd, the threshold is Pth, and the received power of the n-th subframe is Pn, UE detects a subframe n which satisfies the following Formula 1 as the "MBSFN subframe that RN uses as the backhaul" in the neighbor RNs.

[Formula 1]

$$P_n < P_{th} (P_{th} = P_{max} - P_d) \qquad \text{Formula 1}$$

SECOND EXAMPLE

Further, as a second example of the method of detecting the subframes where measurement should be performed using the received power, the following method may be also used. Firstly, UE measures and averages the received power over the plurality of subframes, and detects an average received power. UE sets a threshold which becomes a predetermined power difference with reference to the average received power, and compares the threshold and the received power of each subframe. Further, UE detects a subframe where the received power is lower than the threshold as the "MBSFN subframe that RN uses as the backhaul" in the neighbor RNs. UE sets subframes except for the detected "MBSFN subframe that RN uses as the backhaul" in the neighbor RNs, as subframes where measurement should be performed.

For example, where the average received power is Pave, UE detects a subframe n which satisfies the following Formula 2 as the "MBSFN subframe that RN uses as the backhaul" in the neighbor RNs, in a similar way to Formula 1.

[Formula 2]

$$P_n < P_{th}, (P_{th} = P_{ave} \cdot P_d) \qquad \text{Formula 2}$$

THIRD EXAMPLE

Further, as a third example of the method of detecting the subframes where measurement; should be performed using the received power, the following method may be also used. Firstly, UE detects the received power in subframes which are not the "MBSFN subframe that RN uses as the backhaul" in RN1 or RN2. UE sets a threshold which becomes a predetermined power difference with reference to the received power, and compares the threshold and the received power Pn of each subframe. Further, UE detects a subframe where the received power is lower than the threshold as the "MBSFN subframe that RN uses as the backhaul" in the neighbor RNs. For example, as the subframes except for the "MBSFN subframe that RN uses as the backhaul", the subframes having subframe numbers 0, 4, 5 and 9, which are not originally set as the MBSFN subframe, are set.

For example, when the received power of the subframe which is not the "MBSFN subframe that RN uses as the backhaul" in RN1 or RN2 is Pnon-MBSFN, UE detects a subframe n which satisfies the following Formula 3 as the "MBSFN subframe that RN uses as the backhaul" in the neighbor RNs, in a similar way to Formula 1.

[Formula 3]

$$P_n < P_{th}, (P_{th} = P_{non\text{-}MBSFN} \cdot P_d)$$ Formula 3

In the cases of the above-described first to third examples, there is a case where signal power from RN which is distant from UE is weak and UE cannot detect the "MBSFN subframe that RN uses as the backhaul" in the RN. However, as RN is distant from UE, interference of RN on UE is reduced. Thus, even though the signal power from RN which is distant from UE cannot be received, UE can detect the subframes where measurement should be performed.

<Detection of Subframes where Measurement Should be Performed—Reception of Control Information on DL>

The reception processing is performed for control information (specifically, PDCCH or the like of LTE) transmitted from each of eNB, RN1 and RN2 and the control information on RN which becomes the MBSFN subframe is detected. In this case, the signal power from RN which is distant from UE is weak, and thus, the control information on the RN may not be detected, but since the interference from such an RN which is distant is small, the influence on measurement is insignificant and there is no problem.

As described above, in the present embodiment, as UE detects the subframes where measurement should be performed, UE can perform measurement in consideration of dominant interference. Further, since the subframes where measurement should be performed is not necessarily be notified to UE from eNB, RN1 or RN2, it is possible to reduce signaling overhead.

(Modification of UE)

Figure 7:
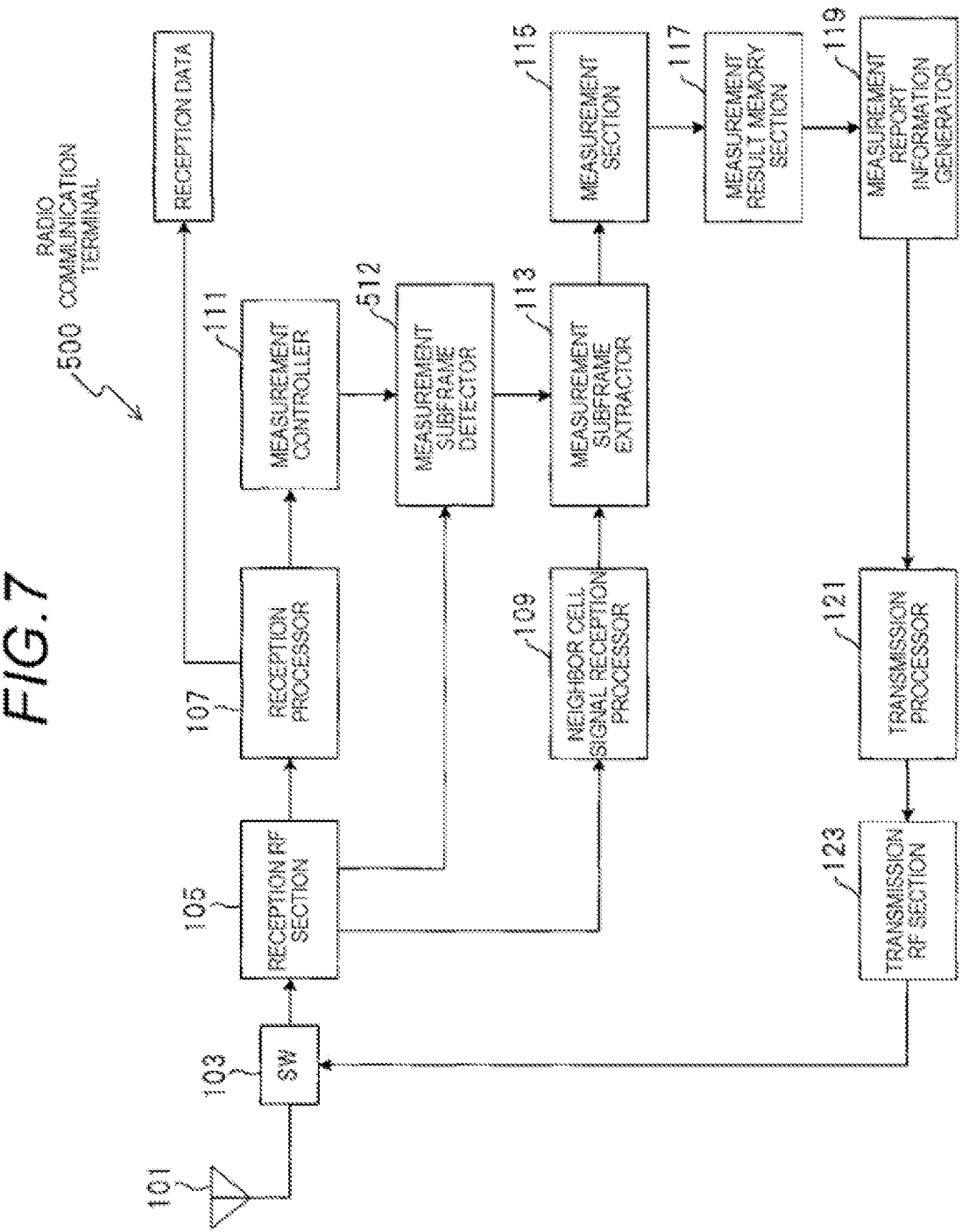
FIG. 7 is a block diagram illustrating a configuration of a radio communication terminal 500 which is a modification of the radio communication terminal 100.

Here, a configuration of a radio communication terminal (UE) 500 in a case where the subframes where measurement should be performed are detected from the received power in the present, embodiment will be described with reference to FIG. 7. FIG. 7 is a block diagram illustrating the configuration of the radio communication terminal 500. The radio communication terminal 500 shown in FIG. 7 is different from the radio communication terminal 100 shown in FIG. 5 in that a measurement subframe detecting section 512 is added. The configuration except for this is the same as in the embodiment shown in FIG. 5, and the same reference numerals are given to the same elements, and detailed description thereof will be appropriately omitted.

The radio communication terminal 500 shown in FIG. 7 includes the antenna 101, the switch (SW) 103, the reception RF section 105, the reception processor 107, the neighbor cell signal reception processor 109, the measurement controller 111, the measurement subframe detector 512, the measurement subframe extractor 113, the measurement section .115, the measurement result memory section 117, the measurement report information generator 119, the transmission processor 121, and the transmission RF section 123.

When there is an instruction for performing measurement in the control information on the radio communication terminal output from the reception processor 107, the measurement controller 111 instructs the measurement subframe detector 512 to detect the subframes where measurement should be performed.

The measurement subframe detector 512 detects the subframes where measurement should be performed using the signals output from the reception RF section 105 based on the instruction of the measurement controller 111.

For example, as the method of detecting the subframes where measurement should be performed by the measurement subframe detector 512, the first to third examples in which the subframes where measurement should be performed are detected using the received power and the example in which the subframes where measurement should be performed are detected by receiving the control information (PDCCH or the like of LTE) about the downlink transmitted by eNB, RN1 or RN2, are used.

On the basis of the subframes where measurement should be performed detected by the measurement, subframe detector 512, the measurement subframe extractor 113 extracts the neighbor cell signals output from the neighbor cell signal reception processor 109 on a subframe basis, and outputs the result to the measurement section 115.

The measurement section 115 performs measurement using the neighbor cell signals extracted by the measurement subframe extractor 113, and outputs the result to the measurement result memory section 117.

The measurement result memory section 117 stores the measurement result measured by the measurement section 115 and the subframe number of the subframes where measurement should be performed detected by the measurement subframe detector 512, and then outputs the result to the measurement report information generator 119.

The measurement report information generator 119 generates information to be reported to eNB using the measurement result and the subframe numbers of the subframes where measurement should be performed stored in the measurement result memory section 117, at the timing when the measurement result is reported to eNB, and then outputs the result to the transmission processor 121.

In the present embodiment, the method of directly notifying the subframes where measurement is performed to UE from eNB, RN1 and RN2 is described, but this is not limitative. eNB, RN1 and RN2 may notify, for each neighbor RN, the position of the "MBSFN subframe that RN uses as the backhaul" in the neighbor RNs, and may derive subframes which are not the "MBSFN subframe which is used as the backhaul" in all the RNs in UE, to thereby specify the subframes where measurement is performed.

In the present embodiment, as the subframes where measurement should be performed, the subframes which are not the "MBSFN subframe that RN uses as the backhaul" in the neighbor RNs are notified, but this is not limitative. In a case where the subframes which are not the "MBSFN subframe that RN uses as the backhaul" in RN are determined, the subframes may be determined as the subframes where measurement should be performed. For example, in LTE, subframes [0, 4, 5, 9] are determined in order not to be set as the MBSFN subframes. Thus, since the subframes where measurement should be performed is not necessarily be notified, it is possible to suppress signaling overhead.

In the present embodiment, UE averages the measurement result in the subframes where measurement is performed over a plurality of times, to thereby enhance the accuracy of measurement.

In the present embodiment, as the subframes where measurement is performed, the subframes which are not the "MBSFN subframe that RN uses as the backhaul" in the neighbor RNs are determined, but this is not limitative. For example, in the neighbor eNB, RN1 or RN2, a subframe where traffic is small and data is not transmitted may be present. This subframe is also the same as the MBSFN subframe used as the backhaul in RN in the present embodiment. Thus, it may be considered that the subframe where traffic is small and data is not transmitted is not included in the subframes where measurement is performed.

In the present embodiment, the neighbor RN includes, in a case where the own cell is RN, an RN to which UE is connected and other RNs connected to eNB to which the RN is connected, and includes, in a case where the own cell is eNB, RNs connected to the eNB, but this is not limitative. For example, the neighbor RN may include RNs connected to a different eNB. In this case, by exchanging position information on the MBSFN subframe used as the backhaul of RN connected to each eNB between eNBs, the same operation as in the present embodiment may be performed.

(Second Embodiment)

Hereinafter, a second embodiment of the present invention will be described with reference to FIGS. 8 to 11.

Figure 8:
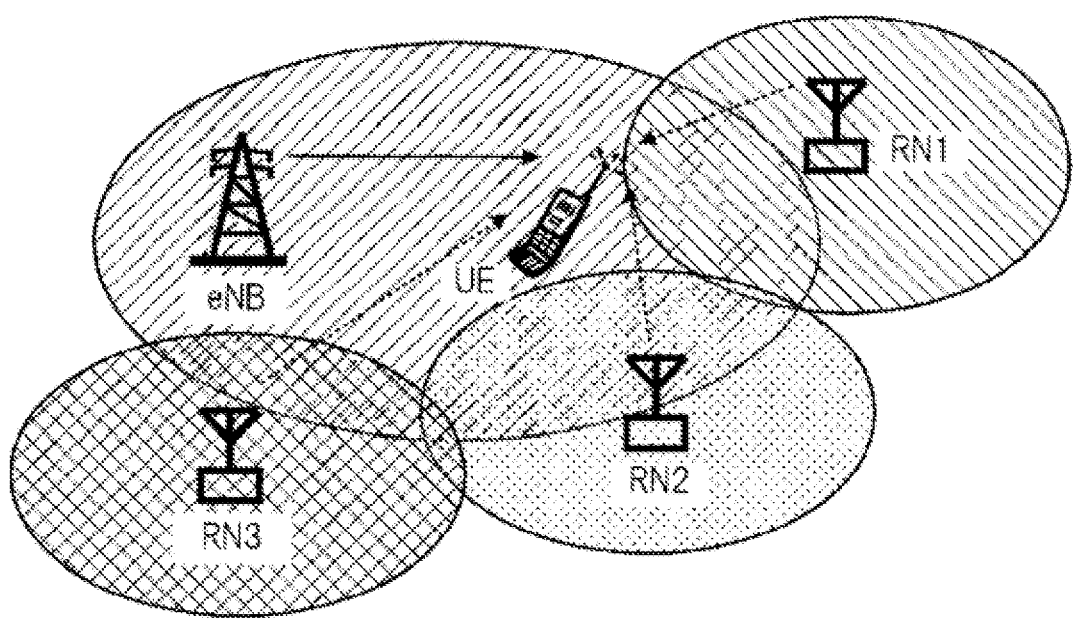
FIG. 8 is a diagram illustrating a radio relay system according to a second embodiment of the present invention.

Firstly, a radio relay system according to the second embodiment of the present invention will be described. FIG. 8 is a diagram illustrating the radio relay system in the second embodiment of the present invention. In FIG. 8, eNB represents a base station (base station apparatus) 400, RN1, RN2 and RN3 represent relay stations 610, 620 and 630, and UE represents a radio communication terminal 700, respectively.

Hereinafter, in the second embodiment, the radio communication terminal 700 is referred to as UE, the base station 400 is referred to as eNB, and the relay stations 610, 620 and 630 are referred to as RN1, RN2 and RN3, respectively.

Hereinafter, in the second embodiment, as studied in LTE-A, RN1 and RN2 have an individual cell ID, in a similar way to eNB. Thus, when viewed from UE, RN1 and RN2 may be considered as one cell, respectively, in a similar way to eNB.

Hereinafter, in the second embodiment, as studied in LTE-A, a relay method of dividing a backhaul channel and an access channel of RN into time domains (on a subframe basis) for allocation is used.

Here, in the first embodiment, when the plurality of RNs are present, as the number of "MBSFN subframes that RN uses as the backhaul" is increased in all the RNs, the number of subframes where measurement is performed is reduced, and thus, samples may not be sufficiently obtained, thereby lowering the accuracy of measurement. On the other hand, when sufficient samples are obtained to maintain the accuracy of measurement, it may take time for measurement.

Thus, in the second embodiment, when the plurality of RN1, RN2 and RN3 are present, it is considered that the amount of interference of each RN on UE changes according to the distance from each RN to UE. That is, Since the interference amount on UE is reduced in RN which is distant from UE, the influence on measurement is small.

Figure 9:
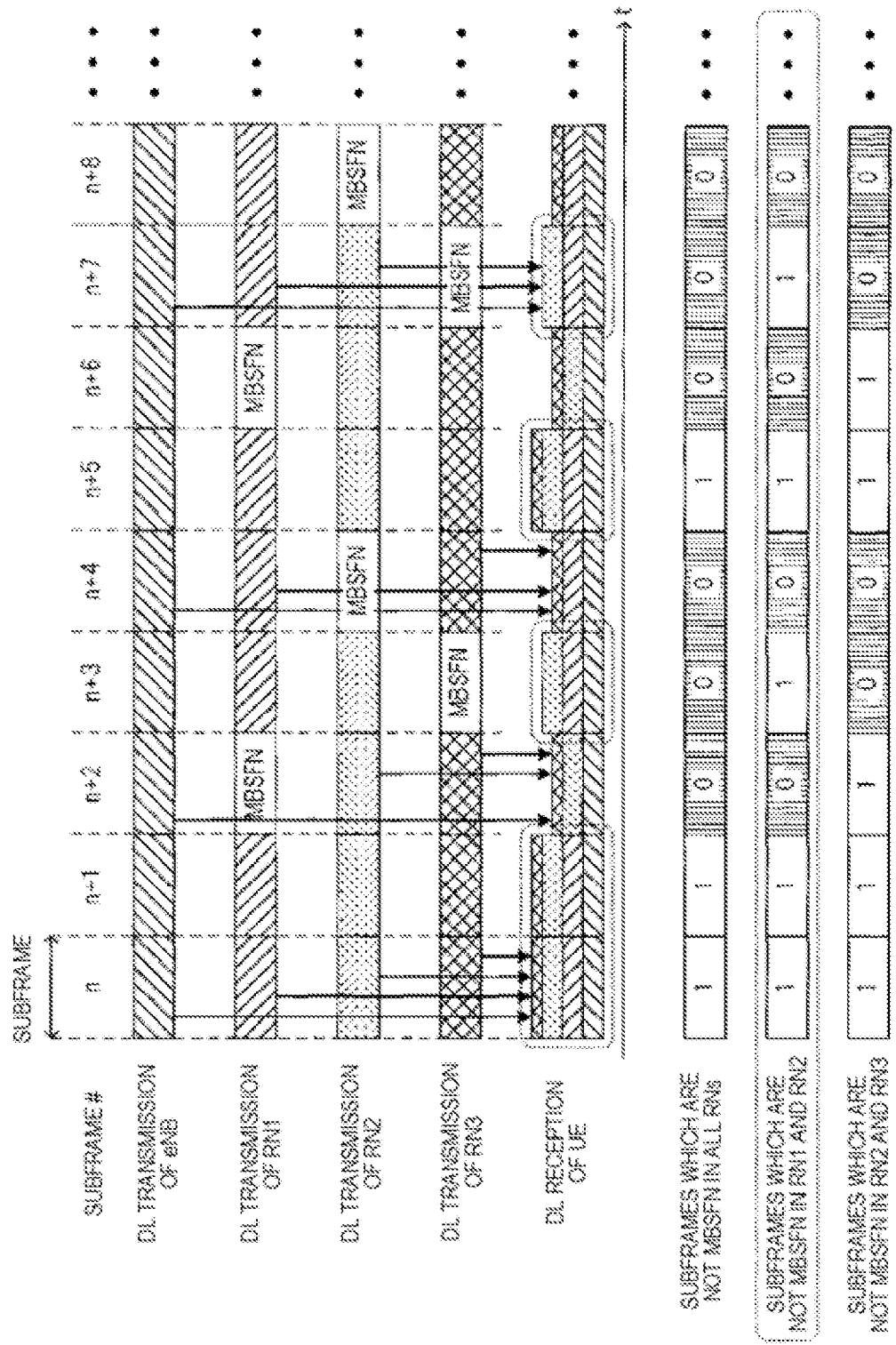
FIG. 9 is a diagram illustrating downlink subframes in FIG. 8.

Here, the relationship between the distance from each RN to UE and the interference amount of each RN on UE will be described with reference to FIGS. 8 and 9. FIG. 9 is a diagram illustrating subframes of DL in the radio relay system shown in FIG. 8. In FIG. 8, UF is connected to eNB. It is assumed that UE is positioned in the vicinity of RN1 and RN2 and the position of RN3 is distant from UE compared with the positions of RN1 and RN2.

Referring to FIG. 9. the positions of the "MBSFN subframes that RN uses as the backhaul" in RN1 are the subframes [n+2, n+6]. The positions of the "MBSFN subframes that RN uses as the backhaul" in RN2 are the subframes [n+4, n+8]. The positions of the "MBSFN subframes that RN uses as the backhaul" in RN3 are the subframes [n+3, n+7].

Since RN3 is distant from UE compared with RN1 or RN2, the amount of interference of RN3 on UE is smaller than that of RN1 or RN2. Thus, in the entire interference amount on UE, the interference amount of RN1 or RN2 which is close to UE is dominant, and the interference amount of RN3 which is distant from UE has an insignificant influence in the entire interference amount.

Since even the "MBSFN subframe that RN uses as the backhaul" in RN3 which is distant from UE has an insignificant, influence in the entire interference amount on UE, the "MBSFN subframe that RN uses as the backhaul" as the subframes where measurement is performed has an insignificant influence in measurement.

Accordingly, in FIG. 9, in RN1 and RN2 other than RNS which is distant from UE compared with RN1 and RN2, by notifying UE of the subframes [n, n+1, n+3, n+5, n+7] as the subframes which are not the "MBSFN subframe that RN uses as the backhaul", UE can ascertain the subframes where measurement should be performed. Further, the number of subframes where measurement should be performed can be increased.

Further, RN1 and RN2 which have dominant interference in the entire interference amount of each RN on UE are RN1 and RN2 which are positioned closer to UE than RN3. It can be said that RNs which are close in distance to each other with reference to one UE are neighbor RNs. For example, in FIG. 8, RN1 is adjacent to RN2, and RN2 is adjacent to RN3, which are close in distance to RN, but RN1 is not adjacent to RN3. Accordingly, it can be said that RN3 which is not adjacent to a different RN is not the dominant interference for one UE. Thus, as shown in FIG. 9, as a combination of a plurality of RNs which do not become the MBSFN subframe, neighbor RNs have only to be used.

Accordingly, the radio relay system according to the second embodiment determines the subframes which are not the "MBSFN subframe that RN uses as the backhaul" on the basis of information on the combination of the neighbor RNs when eNB, RN1 or RN2 notifies UE of the subframes where measurement should be performed. As a result, the handover processing and control becomes easy.

On the basis of the above-described relationship between the distance from each RN to UE and the interference amount of each RN on UE, UE according to the present embodiment groups the neighbor RNs, and performs measurement of handover in the subframes which are not the "MBSFN subframe that RN uses as the backhaul" in RNs in the group. Hereinafter, a specific method will be described with reference to FIGS. 8 and 9. In FIG. 8, a set of RN1 and RN2 and a set of RN2 and RN3 are neighbor RN groups, respectively. The set of RN1 and RN2 is referred to as an RN group 1, and the set of RN2 and RN3 is referred to as an RN group 2.

Here, referring to FIG. 9, the subframes [n, n+1, n+3, n+5, n+7] are subframes which are not the "MBSFN subframes that RN uses as the backhaul" in RNs which form the RN group 1. Further, the subframes [n, n+1, n+2, n+5, n+6] are subframes which are not the "MBSFN subframes that RN uses as the backhaul" in RNs which form the RN group 2. These subframes become subframes of each RN group where measurement should be performed. eNB or each RN exchanges information relating to the positions of the MBSFN subframes for the backhaul in each RN between eNB and RNs, derives the subframes of each RN group where measurement should be performed, and notifies UE of the subframes where measurement should be performed.

As a specific method in which eNB or each RN notifies UE of the subframes where measurement should be performed, for example, in a similar way to the first embodiment, the method of notifying the subframes by the bit map pattern is used, or the method of tabulating the subframes where measurement should be performed to notify the index of the table is used.

In the second embodiment since RN3 is positioned distant from UE compared with RN1 and RN2, UE performs measurement in the subframes of the RN group 1 including RN1 and RN2 where measurement is performed.

eNB or each RN gives an instruction to UE with respect to the RN group used when UE performs measurement. In this case, when eNB or each RN has ascertained the position of UE, eNB or each RN gives an instruction to UE to select the RN group from which RN3 which is distant from UE is removed and to perform measurement in the subframes of the RN group where measurement should be performed. On the other hand, when eNB or each RN has not ascertained the position of UE, eNB or each RN notifies UE of the subframes of each RN group where measurement should be performed and gives an instruction to UE to perform measurement for all the RN groups. Alternatively, eNB or each RN gives an instruction to UE to sequentially perform measurement for each RN group.

As described above, in the present embodiment, since the number of subframes used for measurement can be secured even when the plurality of RNs are present, UE can measure the quality in communication with the handover destination with high accuracy. Thus, it is possible to suppress occurrence of errors between the quality based on the measurement result and the actual quality of the handover destination, and UE can achieve throughput expected on the basis of the measurement result in the handover destination.

Since the configuration of the radio communication terminal 700 according to the present embodiment is the same as that of the radio communication terminal 100 according to the first embodiment, detailed description thereof will be omitted.

Figure 10:
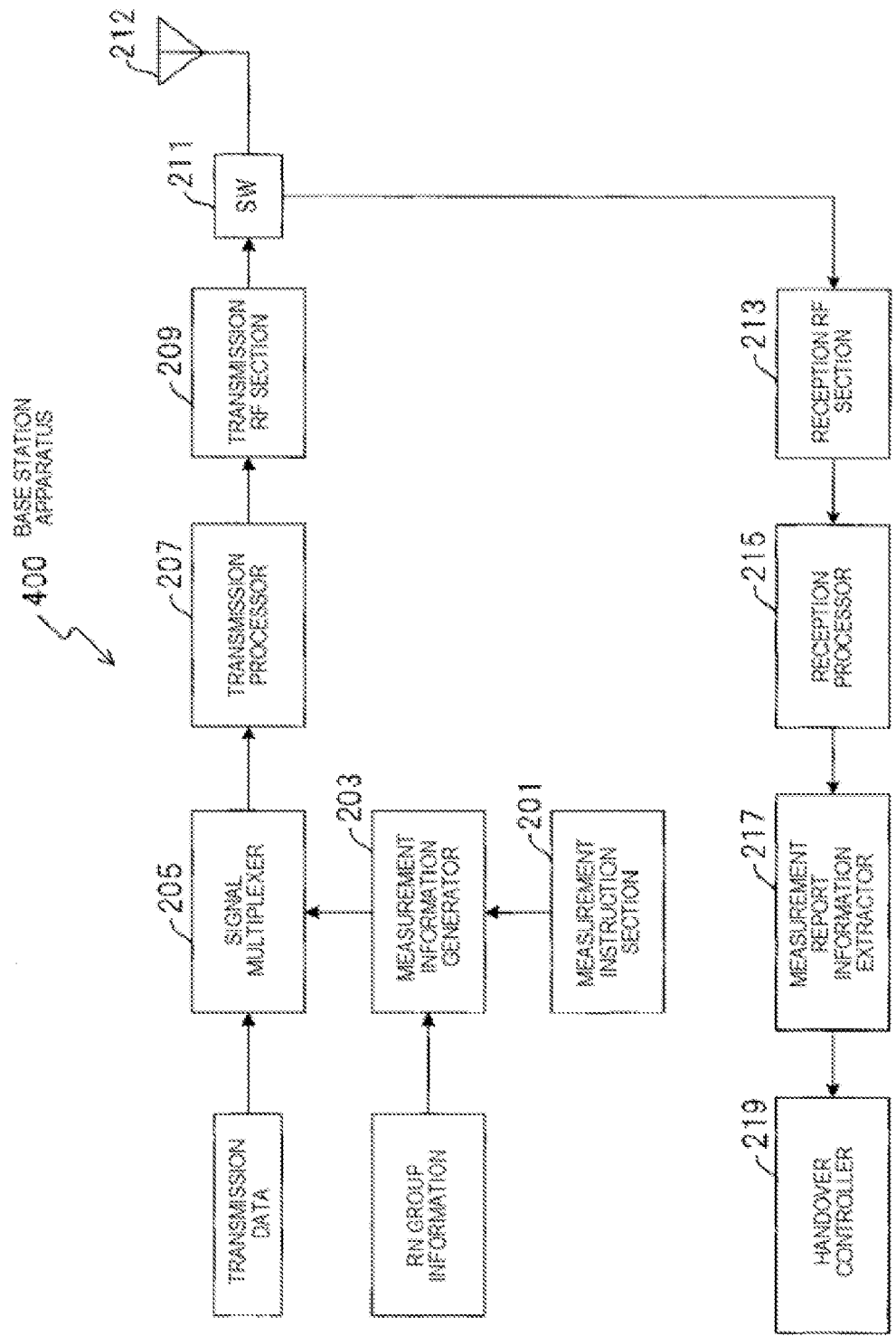
FIG. 10 is a block diagram illustrating a configuration of a base station apparatus 400 according to the second embodiment.

Next, the configuration of the base station (base station apparatus) 400 according to the present embodiment will be described with reference to FIG. 10. FIG. 10 is a block diagram illustrating the configuration of the base station 400 according to the present embodiment. Here, the base station 400 shown in FIG. 10 is different from the base station 200 shown in FIG. 6 in that RN information input to the measurement information generator 203 becomes RN group information. The configuration except for this is the same as in the embodiment shown in FIG. 6, and the same reference numerals are given to the same elements, and detailed description thereof will be appropriately omitted.

The base station 400 (eNB) shown in FIG. 10 includes the measurement instruction section 201, the measurement, information generator 203, the signal multiplexer 205, the transmission processor 207, the transmission RF section 209, the switch (SW) 211, the antenna 212, the reception RF section 213, the reception processor 215, the measurement report information extractor 217, and the handover controller 219.

The RN group information refers to information relating to an RN group including a combination of a plurality of RNs, such as subframes of each RN group where measurement should be performed, and is input to the measurement information generator 203. The subframes of each RN group where measurement should be performed are the subframes which are not the "subframe where RN uses as the backhaul" in RNs in each RN group. Further, the RN group may use RNs formed at the installation timing or the like of RNs as they are, or may continuously use RNs which are periodically formed. As a method of grouping RNs, for example, a method of combining neighbor RNs for grouping, a method of grouping RNs which are close in distance, or the like, may be used.

The measurement instruction section 201 instructs the measurement information generator 203 to generate the measurement information so that measurement of a cell adjacent to UE in which the handover is necessary is performed. At this time, the measurement instruction section 201 instructs UE to use subframes of a certain RN group where measurement is performed.

The measurement information generator 203 generates control information relating to measurement based on the measurement instruction from the measurement instruction section 201, and outputs the result to the signal multiplexer 205. As the information relating to the measurement, there is information relating to the subframes of RN group where measurement should be performed indicated by the measurement instruction section 201.

In the present embodiment, eNB or RN notifies UE of the RN group used when measurement should be performed in UE, but this is not limitative. For example, a method may be used in which eNB or RN notifies UE of information relating to the subframes of the plurality of RN groups where measurement should be performed and UE determines the RN group.

Here, a method of determining the RN group in UE; will be described with reference to FIG. 9. Firstly, with respect to all the RN groups, UE performs measurement of received power for the subframes [n, n+1, n+2, n+3, n+5, n+6, n+7] having the possibility of being the subframes where measurement is performed. Further, measurement results of the received power in the respective subframes are compared with respect to the subframes where measurement is performed. The RN group 1 includes the subframes [n, n+1, n+3, n+5, n+7], and the RN group 2 includes the subframes [n, n+1, n+2, n+5, n+6].

Here, the RN group 1 has a smaller change in the received power in the respective subframes than the RN group 2. Contrarily, the RN group 2 has a larger change in the received power in the respective subframes than the RN group 1. In the case of the RN group 2 in which the change in the received power in the respective subframes is large, UE performs measurement in the subframes in which a dominant interference component is not present. Accordingly, UE may detect the RN group 1 in which the change in the received power in the respective subframes is small.

For example, where the maximum received power in the RN group 1 is PG1_max and the minimum received power is PG1_min, a received power difference PG1_D in the RN group 1 is expressed as the following Formula 4.

[Formula 4]

$$P_{G1\_D} = P_{G1\_max} \cdot P_{G1\_min} \qquad \text{Formula 4}$$

Similarly, with respect to the RN group 2, where the maximum received power is PG2_max and the minimum received power is PG2_min, a received power difference PG2_D in the RN group 2 is expressed as the following Formula 5.

[Formula 5]

$$P_{G2\_D} \approx P_{G2\_max} \cdot P_{G2\_min} \qquad \text{Formula 5}$$

Here, UE may compare the received power difference PG1_D in the RN group 1 with the received power PG2_D in the RN group 2, and may detect the RN group in which the received power difference is small. In addition to the difference between the maximum received power and the minimum received power in the respective subframes, dispersion or standard deviation of the received power in the respective subframes, threshold determination from an average value thereof, or the like, may be used. Further, the RN group is detected using the received power in the respective subframes, but the measurement result may be used.

<Modification of UE>

Figure 11:
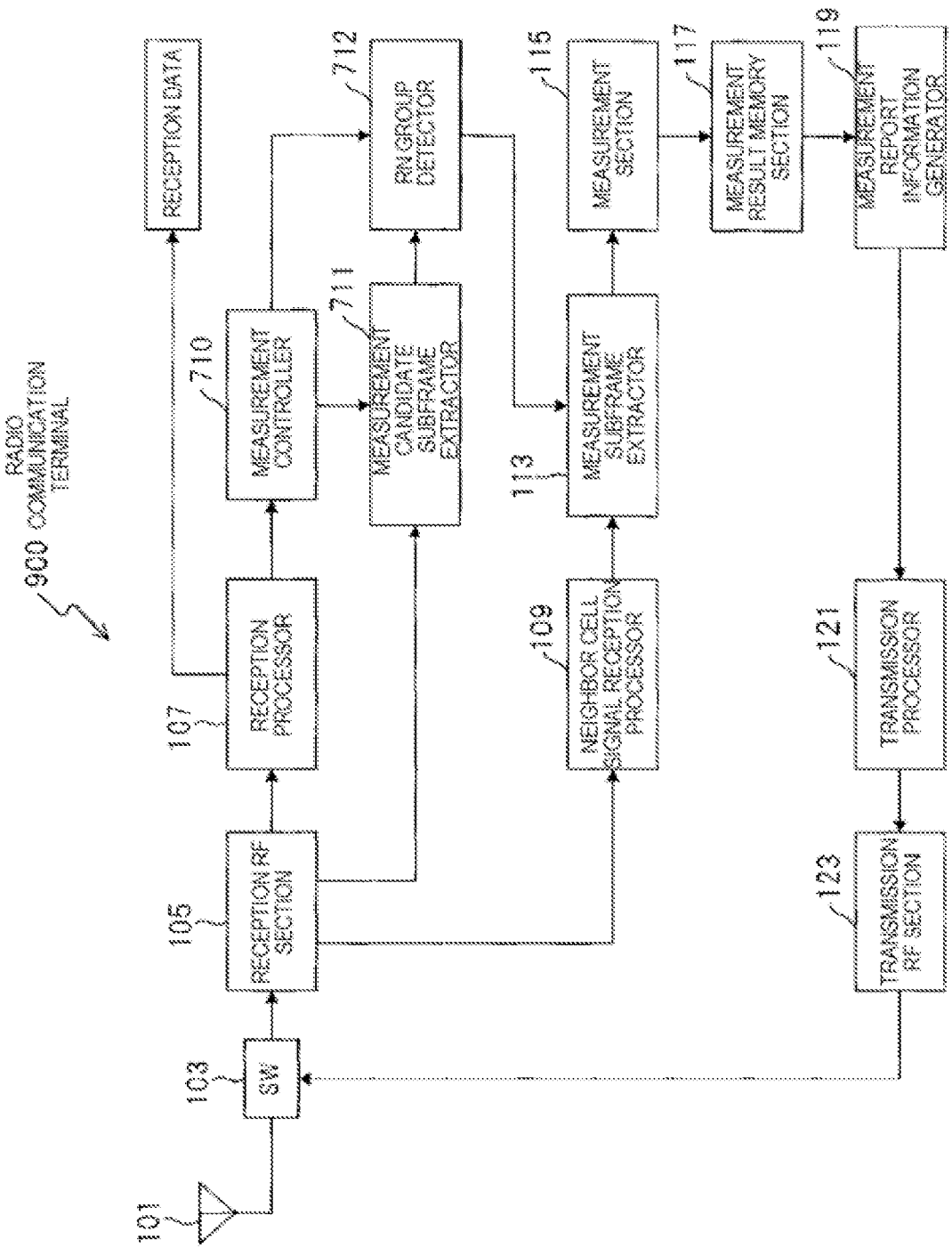
FIG. 11 is a block diagram illustrating a configuration of a modification of a radio communication terminal according to the second embodiment.
Figure 12:
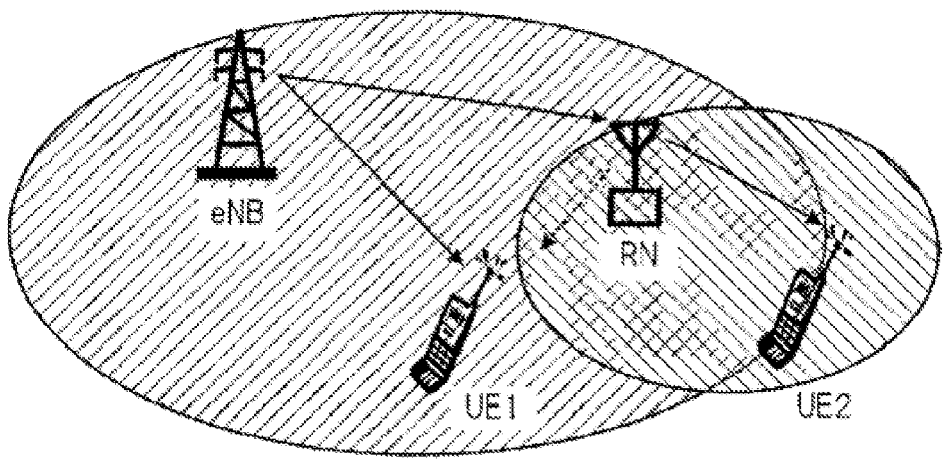
FIG. 12 is a diagram illustrating a radio relay system in the related art.
Figure 13:
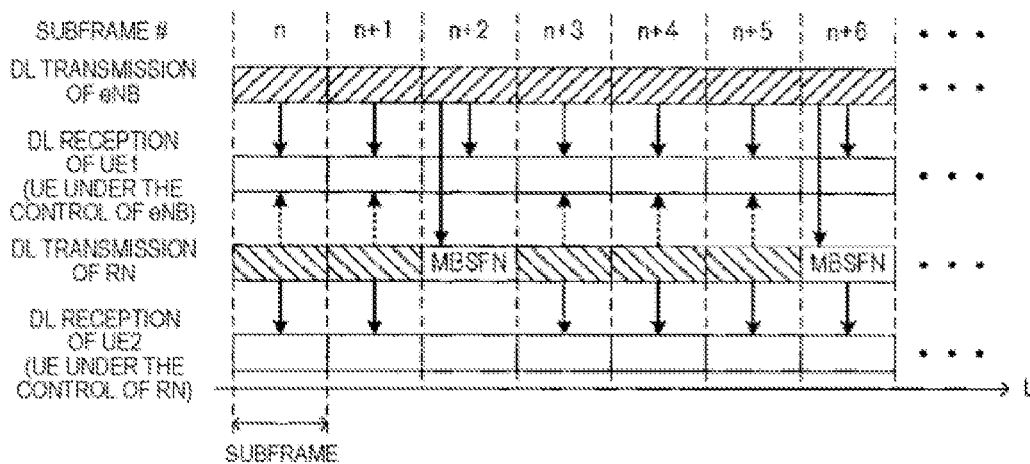
FIG. 13 is a diagram illustrating a configuration of downlink subframes in a relay method in the related art.

The configuration of UE when UE detects the RN group as described above will be described with reference to FIG. 11. FIG. 11 is a block diagram illustrating the configuration of the modification (UE) of the radio communication terminal 700 in the second embodiment. The radio communication terminal 900 shown in FIG. 11 includes the antenna 101, the switch (SW) 103, the reception RF section 105, the reception processor 107, the neighbor cell signal reception processor 109, a measurement controller 710, a measurement candidate subframe extractor 711, an RN group detector 712, the measurement subframe extractor 113, the measurement section 115, the measurement result memory section 117, the measurement report information generator 119, the transmission processor 121, and the transmission RF section 123.

The block diagram of UE shown in FIG. 11 is different from the block diagram of UE shown in FIG. 5 in that the measurement candidate subframe extractor 711, and the RN group detector 712 are added. The configuration except for this is the same as in the embodiment shown in FIG. 5, and the same reference numerals are given to the same elements, and detailed description thereof will be appropriately omitted.

The measurement, controller 710 detects whether an instruction for performing measurement is included in control information relating to the radio communication terminal output from the reception processor 107. When the instruction for performing measurement is included therein, the measurement controller 710 extracts the RN groups and the RN group information relating to the subframes where measurement should be performed from the control information.

Further, the measurement controller 710 outputs information on the positions of the subframes having the possibility of being candidates for the subframes where measurement should be performed to the measurement candidate subframe extractor 711, from the extracted information, and then outputs the RN group information to the group detector 712.

The measurement candidate subframe extractor 711 extracts the position information relating to the subframes of the measurement candidates from the signal output from the reception RF section 105 on a subframe basis, based on the position information relating to the subframes of the measurement candidates output from the measurement controller 710, and outputs the result to the RN group detector 712.

The RN group detector 712 measures the received power on a subframe basis using the signal output from the measurement candidate subframe extractor 711. Further, the RN group detector 712 compares the received power for the subframes of each RN group where measurement should be performed, and detects an RN group in which change in the received power in the respective subframes is the smallest. As the detection method of the RN group, as described above, UE compares the received power difference PG1_D in the RN group 1 with the received power difference PG2_D in the RN group 2, and detects the RN group in which the received power difference is small. Further, in the RN group in which the received power changed in the respective subframes is the smallest, the RN group detector 712 outputs information on the subframes in which measurement should be performed to the measurement subframe extractor 113.

The measurement subframe extractor 113 extracts a neighbor cell signal output from the neighbor cell signal reception processor 109 on a subframe basis, on the basis of the information relating to the subframes where measurement is performed output from the RN group detector 712, and outputs the result to the measurement section 115.

In the present embodiment, UE averages the measurement results in the subframes where measurement is performed over a plurality of times, thereby making it possible to enhance the accuracy of measurement.

In the present embodiment, as the subframes where measurement is performed, the subframes which are not the "MBSFN subframe that RN uses as the backhaul" in the neighbor RNs are used, but this is not limitative. For example, in the neighbor eNB, RN1 or RN2, a subframe where traffic is small and data is not transmitted may be present. This subframe is also the same as the MBSFN subframe used as the backhaul in RN in the present embodiment. Thus, it may be considered that the subframe where traffic is small and data is not transmitted is not the subframe where measurement should he performed.

In the present embodiment, the neighbor RN includes, in a case where the own cell is RN, an RN to which UE is connected and other RNs connected to eNB to which the RN is connected, and includes, in a case where the own cell is eNB, RNs connected to the eNB, but this is not limitative. For example, the neighbor RN may include RNs connected to a different eNB. In this case, by exchanging position information on the MBSFN subframe used as the backhaul of RN connected to each eNB between eNBs, the same operation as in the present embodiment may be performed.

While description is given of an antenna in the above respective embodiments, the present invention is similarly applicable in the case of an antenna port. The antenna port refers to a logical antenna including one or a plurality of physical antennas. That is, the antenna port does not always refer to one physical antenna, but may refer to an array antenna or the like including a plurality of antennas. For example, in LTE, how many physical antennas an antenna port includes is not defined, and reference signals of different base stations are defined as minimum units that can be transmitted. Further, the antenna port is sometimes defined as a minimum unit that is multiplied by the weighting of a preceding vector.

Further, the functional blocks used for the description of the embodiment are typically implemented as an LSI which is an integrated circuit. These may be individually formed as one chip or may be formed as one chip so as to include some or all. While an LSI is cited in this description, it is sometimes called an IC, a system LSI, a super LSI or an ultra LSI according to the difference in integration degree.

Further, the method of circuit integration is not limited to an LSI, and the functional blocks may be implemented as a dedicated circuit or a general purpose processor. After the manufacture of an LSI, a programmable FPGA (Field Programmable Gate Array) or a reconfigurable processor where the connection and setting of the circuit cells in the LSI are reconfigurable may be used.

Further, it is to be noted that when a circuit integration technology that replaces the LSI appears by the progress of the semiconductor technology or a derivative other technology, the functional blocks may be integrated by using the technology. Biotechnology adaptation or the like can be a possible example.

While the present invention has been described in detail with reference to a specific embodiment, it is obvious to one of ordinary skill in the art that various changes and modifications may be added without departing from the spirit and scope of the present invention.

The present application is based on Japanese Patent Application (Japanese Patent Application No. 2009-139294) filed on Jun. 10, 2009, the contents of which are incorporated herein by reference.

INDUSTRIAL APPLICABILITY

The radio communication terminal and radio communication method according to the present invention have the following effects: the quality in communication with the handover destination can be measured with high accuracy and the radio communication terminal is useful as a radio communication terminal.

REFERENCE SIGNS LIST 100, 500, 900 Radio communication terminal
101, 212 Antenna
103, 211 Reception RF section
107, 215 Reception processor
109 Neighbor cell signal reception processor
111 Measurement controller
113 Measurement subframe extractor
115 Measurement section
117 Measurement result memory section
119 Measurement report information generator
121, 207 Transmission processor
123, 209 Transmission RF section
200, 400 Base station (base station apparatus)
201 Measurement instruction section
203 Measurement information generator
205 Signal multiplexer
217 Measurement report information extractor
219 Handover controller
512 Measurement subframe detector
710 Measurement controller
711 Measurement candidate subframe extractor
712 RN group detector

The invention claimed is:

1. A terminal apparatus comprising:
a receiving section configured to receive control information indicating subframes, for which a channel quality is measured; and
a measuring section configured to measure the channel quality for the subframes that said control information indicates,
wherein, out of subframes including a first subframe with no transmission of data by another cell and a second subframe with transmission of data by the other cell, the second subframe is included in the subframes that said control information indicates.

2. The terminal apparatus according to claim 1, wherein the other cell is neighbor cell.

3. The terminal apparatus according to claim 1, wherein the other cell causes interference.

4. The terminal apparatus according to claim 1, wherein a subframe other than a MBSFN (Multicast/Broadcast over Single Frequency Network) subframe is included in the subframes that said control information indicates.

5. The terminal apparatus according to claim 1, wherein said control information indicates the second subframe, out of subframes including the first subframe with no transmission of data by the other cell and the second subframe with transmission of data by the other cell, as being bit mapped.

6. The terminal apparatus according to claim 1, wherein said control information indicates the second subframe, out of subframes including the first subframe with no transmission of data by the other cell and the second subframe with transmission of data by the other cell, as being patterned.

7. The terminal apparatus according to claim 1, wherein the subframes that said control information indicates are different depending on a cell.

8. The terminal apparatus according to claim 1, wherein the measuring section measures the channel quality for a subframe, in which the other cell causes an interference, based on said control information.

9. The terminal apparatus according to claim 1, wherein the measuring section measures a reception power as the channel quality.

10. The terminal apparatus according to claim 1, wherein the measuring section measures a reception quality as the channel quality.

11. A communication method comprising:
receiving control information indicating subframes, for which a channel quality is measured; and
measuring the channel quality for the subframes that said control information indicates,
wherein, out of subframes including a first subframe with no transmission of data by another cell and a second subframe with transmission of data by the other cell, the second subframe is included in the subframes that said control information indicates.

* * * * *